(No Model.) 3 Sheets—Sheet 1.
P. J. SINGER.
SAFETY ATTACHMENT FOR ELEVATORS.
No. 277,073. Patented May 8, 1883.
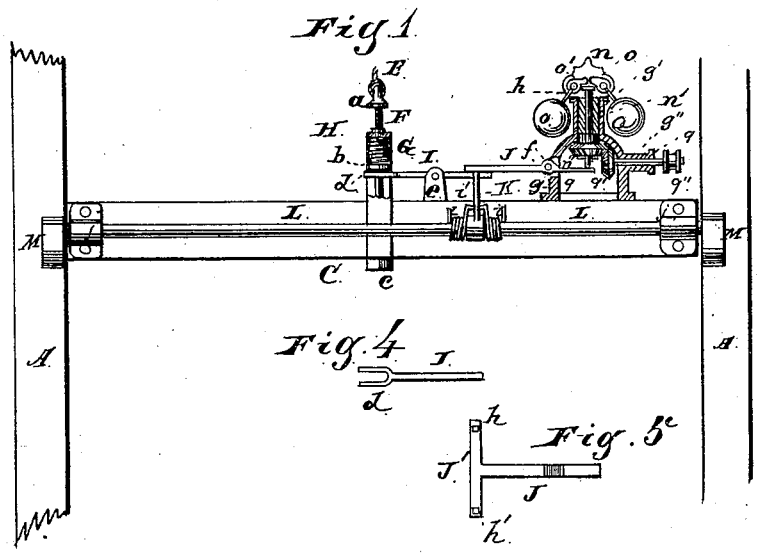
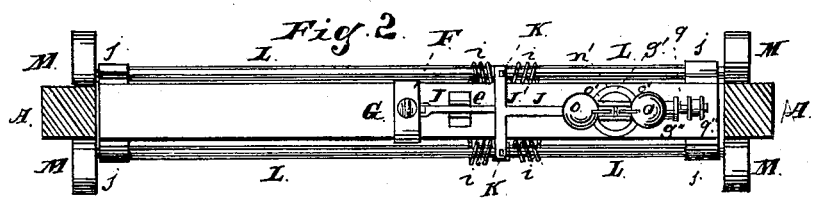
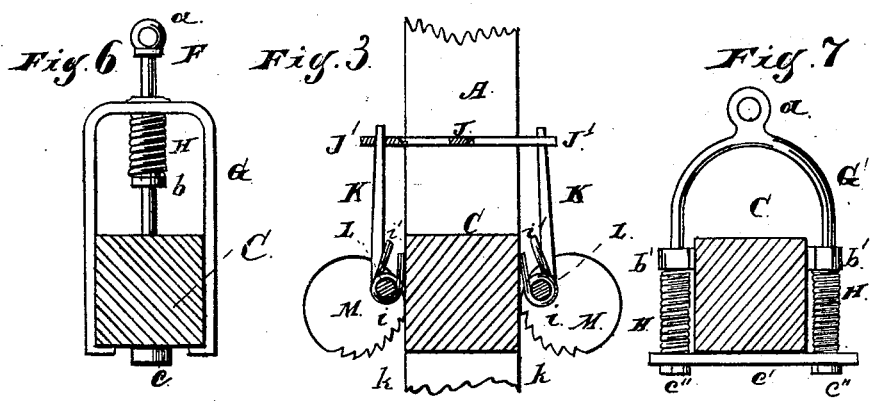
Witnesses:
Albert H. Adams.
O. W. Bond.
Inventor
Peter J. Singer (No Model.) 3 Sheets—Sheet 2.
P. J. SINGER.
SAFETY ATTACHMENT FOR ELEVATORS.
No. 277,073. Patented May 8, 1883.
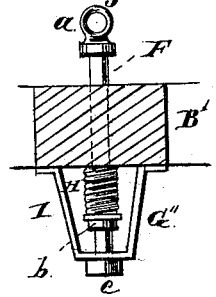
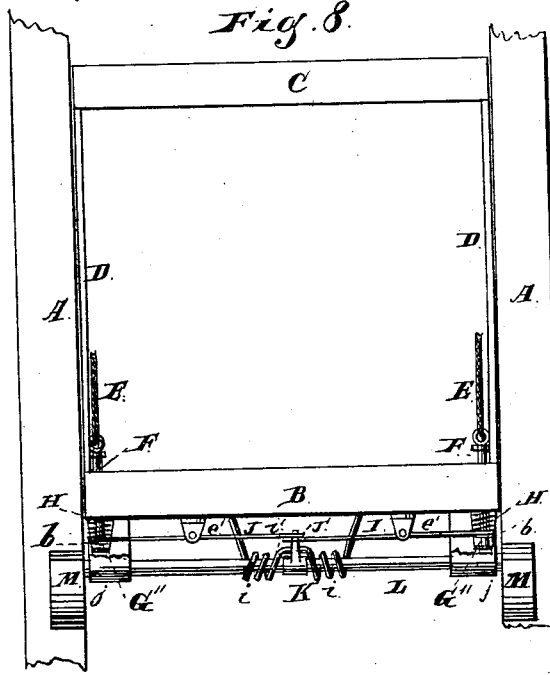
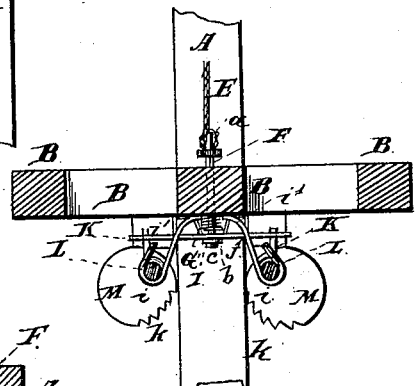
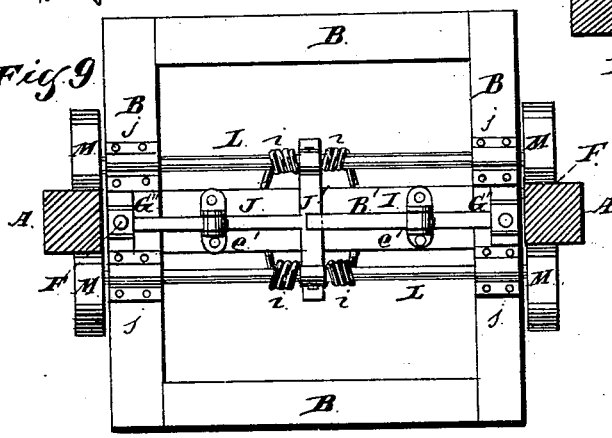
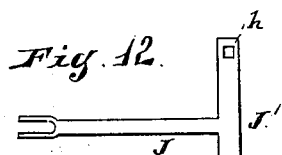
Witnesses:
Albert H. Adams
O. W. Bond
Inventor:
Peter J. Singer (No Model.) 3 Sheets—Sheet 3.
P. J. SINGER.
SAFETY ATTACHMENT FOR ELEVATORS.
No. 277,073. Patented May 8, 1883.
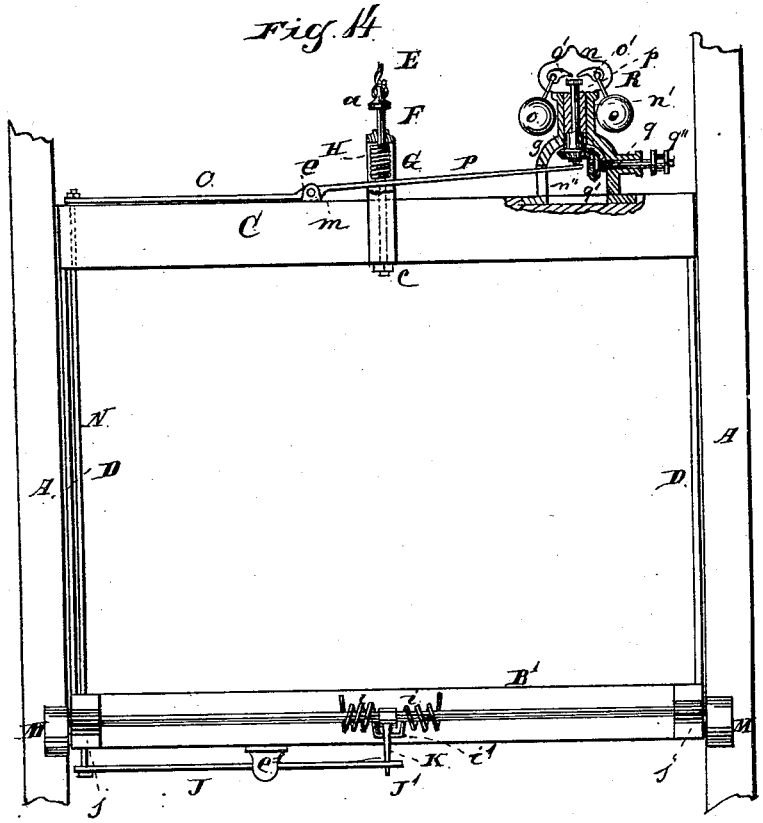
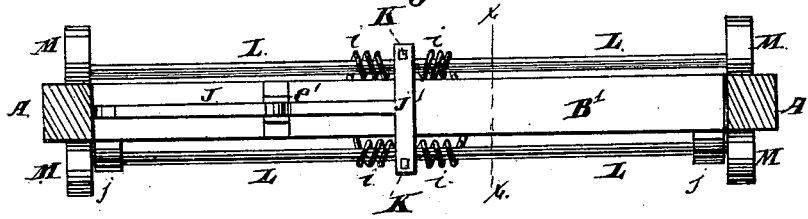
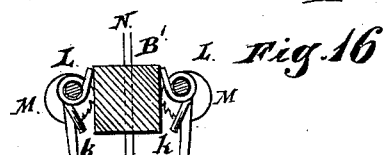
Witnesses:
Albert H Adams
A. W. Bond
Inventor:
Peter J. Singer

UNITED STATES PATENT OFFICE.

PETER J. SINGER, OF CHICAGO, ILLINOIS.

SAFETY ATTACHMENT FOR ELEVATORS.

SPECIFICATION forming part of Letters Patent No. 277,073, dated May 8, 1883.

Application filed March 22, 1883. (No model.)

*To all whom it may concern:*

Be it known that I, PETER J. SINGER, residing at Chicago, in the county of Cook and State of Illinois, and a citizen of the United States, have invented a new and useful Improvement in Safety Attachments for Elevators, of which the following is a full description, reference being had to the accompanying drawings, in which—

Figure 1 is a side elevation of the safety devices, the cage or platform being omitted, except the bar which carries the safety devices, showing also a governor, partly in section, by means of which the safety devices are actuated; Fig. 2, a top or plan view of the parts shown in Fig. 1, with the guide-rails in section; Fig. 3, an enlarged detail, being an end view in cross-section of the devices; Figs. 4 and 5, details of the controlling arms or levers by which the safety-cams are operated; Fig. 6, a detail showing a stirrup and rod or pin to which the hoisting-cable is attached; Fig. 7, a detail showing a modification in the attachment of the hoisting-cable; Fig. 8, a side elevation, showing the controlling-levers and devices for operating them applied to the bottom of a cage or platform; Fig. 9, a bottom view of the parts shown in Fig. 8; Fig. 10, a cross-section through the bottom of the cage or platform of Fig. 8; Figs. 11 and 12, details of the controlling-levers in the form of construction shown in Figs. 8 and 9; Fig. 13, a detail showing a rod or pin and its stirrup, to which the hoisting-cable is attached in the form of construction of Fig. 8; Fig. 14, a side elevation, showing another form and arrangement for operating the devices when applied to the bottom of the cage or platform; Fig. 15, a bottom view of the controlling-lever and devices shown in Fig. 14; Fig. 16, a cross-section on line $x\ x$ of Fig. 15.

This invention relates to safety attachments to be applied to elevators for the purpose of arresting or stopping the descent of the cage or platform in case of breakage of the rope or cable, or of the slacking of such cable for any cause, and has for its object to construct and apply a safety attachment which can be readily applied to elevators of the ordinary construction, and which, when applied, will perform the work of arresting or stopping the descent of the cage or platform, in case of any defect either in the hoisting-cable or from other cause, in a reliable and positive manner when needed; and this object is accomplished by the mechanism illustrated and hereinafter described, and specifically pointed out in the claims.

In the drawings, A represents the guide rails or bars on which the cage or platform rides in ascending and descending.

B is the frame supporting the bottom of the cage or platform.

B' is a central cross-bar, on which the safety attachment is supported when such attachment is applied to the bottom of the cage or platform.

C is the upper or top bar of the cage or platform.

D represents brace-bars connecting the bottom with the upper frame-work of the cage or platform.

The parts represented by the letters A, B, B', C, and D may be of the form of construction and arrangement shown in the several figures, or of such other of the usual and well-known forms as may be desired, and in practice either the top and bottom pieces or the frame-work is to be provided with the usual forks or guides for straddling or forking the guide-rails and maintaining the cage in position in ascending and descending, and, if desired, the top piece, C, may have end bars or pieces—one attached to each end—for forming the upper frame-work.

E is a hoisting-cable operating in the usual manner.

F is a sliding pin or rod, the upper end of which has an eye or loop, $a$, for the attachment of the hoisting-cable.

G is a stirrup or arch, attached in any suitable manner to the upper bar, C, of the cage or platform in the form of construction shown in Fig. 1, through the top or upper cross-bar of which the pin or rod F passes, the pin or rod also passing through the cross-bar C, and having at its lower end a nut or washer, $c$, which, when the hoisting rope or cable is taut, comes in contact with the under face of the bar C and furnishes the means for raising the cage or platform. This stirrup G may be formed as shown in Figs. 1 and 6; or it may be formed as shown in Fig. 7, in which last case the side bars come together at their upper ends, and are formed into an eye or loop, a, for the attachment of the cable, the side bars passing through guides $b'$ on the side of the beam C, and at their lower ends is a cross bar or plate, $c'$, held in position by nuts or washers $c''$ on the end of the side arms of the fork or stirrup. When made as shown in Fig. 7 the rod or bolt F can be dispensed with, as the stirrup or fork performs the office of the rod or bolt, the side arms sliding in the guides $b'$, and the cross-bar $c'$ coming in contact with the under face of the bar C for lifting purposes.

H is a coil-spring located, as shown in Fig. 6, between the collar $b$ on the rod or pin F and the top of the arch or stirrup G, and, as shown in Fig. 7, between the guides $b'$ and the cross-plate $c'$ on each side arm of the stirrup or arch $G'$. This spring H, when the cable is taut or in working condition, is compressed and non-acting; but in case of breakage of the cable or other defect the spring will act and throw the rod or pin F down, or, where the stirrup $G'$ is used, throw such stirrup down.

I is an arm or lever pivoted, at or near its center, in ears or a bracket, $e$, located on the top of the bar C, as shown in Fig. 1, and having at its forward end a fork, $d$, which straddles the pin or rod F, the fork coming immediately below and in contact with the collar $b$ on the rod or pin F.

J is an arm or lever pivoted a little back of its center, as shown in Fig. 1, between ears or a bracket, $f$, on a frame, $g$, which supports a ball-governor, the rear end of the lever J projecting within the frame sufficiently far to pass beyond the center of the governor. The forward end of this arm or lever J has a cross-head, $J'$, in each end of which is a slot or opening, $h$, as shown in Fig. 5, and this forward end of the lever J projects over the rear end of the lever I, as shown in Fig. 1.

K are arms or levers to be used in the forms of construction shown on Sheet 1 of the drawings—one on each side of the bar C. The upper ends of these arms or levers K pass into the slots or openings $h$ in the respective ends of the cross-head $J'$, by which means they are held in an upright or vertical position.

L are shafts—one on each side of the bar C—supported at each end in suitable boxes or bearings, $j$, secured to the sides of the bar C. Each shaft has secured thereto in a firm manner one of the arms or levers K, the attachment being made by a set-screw or other suitable means which will enable the arms or levers to perform the office of holding the shafts in position to have the clamp-eccentrics clear the guide-rails when the elevator is working properly.

M are the clamping-eccentrics, secured in any firm manner, one to each outer end of the rods or shafts L, so as to bring an eccentric on each side of each guide-rail, as shown in Fig. 2, and in such relation to the guide-rail as to be held clear thereof, or be brought in contact therewith by rocking and holding the shaft L in the proper direction. As shown, these eccentrics have a serrated edge or face, $k$, on that portion which engages with the guide-rails, for the purpose of producing a firmer and stronger bite when the eccentrics are brought into action to stop the descent of the cage or platform. The shafts L are held to have the eccentrics clear the guide-rails by the arms or levers K, and they are rotated or turned to throw the eccentrics into contact with the guide-rails by means of springs $i$, consisting of two coiled portions and a connecting portion, $i'$, which passes back of the lever K on the shaft to which the spring is applied, the coiled portion of the spring being around the shaft, and the outer ends being secured, or connected, or in contact with the cross-bar C.

In place of using the coil-springs, as shown, a flat spring could be used; or balls or weights could be applied to the outer end of the arms or levers in such manner as to force the arms or levers down when released from the cross-head $J'$, the balls or weights being applied to the levers so as to come below the cross-head $J'$.

The devices so far described are intended to be applied to the upper bar, C, or top of the cage or platform, and, as is shown in Fig. 1, a governor consisting of a head, $n$, having a journal or bearing, $n'$, mounted in an extension, $g'$, of the frame $g$, and having at its lower end a gear-wheel, $n''$, the head $n$ having pivoted thereto the balls $o$, the stems or shanks of which are provided each with a cam or head, $o'$, which comes in contact with the upper end of a sliding pin, $p$, which works in the bearing $n'$, the lower end of which pin $p$ is in contact with the rear end of the lever J. Motion is imparted to the head $n$ and balls $o$ by the engagement of the gear-wheel $q'$ with the gear-wheel $n''$, the wheel $q'$ being secured to the end of a shaft, $q$, which has its bearings in a head or arm, $g''$, on the frame $g$, which shaft $q$ has on its outer end a pulley, $q''$, which runs on the safety cord or chain, or otherwise, to give the necessary rotation of the shaft $q$ to actuate the governor.

The operation is as follows: In case the cable breaks or becomes slack or otherwise inoperative, the spring H acts to throw the pin or rod F or the stirrup or arch $G'$ down, and this descent of the pin or the stirrup through the collar $b$, or the upper portion of the stirrup $G'$, which being in contact with the inner end of the lever I, forces such end down and raises the rear end, throwing up the cross-head $J'$ of the lever J, releasing the arms or levers K, when the springs $i$ or other devices will act to turn the shafts L and force the eccentrics into contact with the guide-rails, stopping the descent of the cage. In case the hoisting-cable remains intact, and too great a speed is imparted to the cage or platform from any other cause, such increased speed will operate the ball-governor and cause the pin $p$ to descend, forcing the rear end of the lever J down, raising the cross-head J', releasing the arm or levers K, and allowing the shafts to be rotated by the action of the springs $i$ or other means, forcing the eccentrics into engagement with the side rail. By this arrangement it will be seen that in case the cable is non-acting, or the cage has too much speed from other cause, the eccentrics are at once thrown into engagement with the guide-rails by the releasing of the arms or levers K through either the lever I or the lever J.

As shown on Sheet 2 of the drawings, the levers I and J are applied to the bottom of the cage or elevator, and used in connection with two cables instead of one, the cables passing down through the elevator or cage—one on each side—and being attached to sliding pins or rods F, which pass through a cross-beam, B', of the bottom of the cage, and through a stirrup, G'', secured to the under side of such cross-sill B'. The outer end of each lever is forked, and straddles its respective pin F above the collar $b$ on such pin, and the spring H is located between the end of the lever and the under side of the sill or beam B'. The levers are each pivoted in suitable ears or brackets, $e'$, each depending from the under side of the sill or beam B', and their inner ends are arranged to have the end of the lever I come beneath the end of the lever J, the lever J having a cross-head, J', with openings $h$ to receive and hold the arms or levers K, as before described, such arms or levers being secured to the shafts L, having eccentrics M.

The operation of the devices shown on Sheet 2 is essentially the same as that already described for the device of Sheet 1, except that no ball-governor is used, and each lever I J is operated by its spring H through the breakage, slack, or other defect in the cable on either side, the cross-head J', being thrown up, releasing the arms or levers K and allowing the eccentrics to be forced into contact with the guide-rails by the action of the spring $i$ or other devices.

Where a single hoisting-cable is used, and it is desired to apply the clamping-eccentrics to the bottom of the cage or platform, it can be done in the manner shown on Sheet 3 of the drawings, in which case the lever J is pivoted between ears or a hanger, $e'$, and the cross-head engages the arms or levers K, as already described. The rear end of the lever is connected with a sliding rod, N, the upper end of which rod is connected with a rocking arm or lever, O, the inner end, $m$, of which lever O is turned or bent upward, and is pivoted between ears or brackets $e$. A second arm or lever, P, at its forward end, comes in contact with the turned end $m$ of the lever O, and may be also connected with such lever O forward of the pivotal point. This lever P extends back and comes beneath the spring H, and its rear end lies in contact with the pin $p$ of the ball-governor. The operation of this form of construction is the same, substantially, as the operation described in the devices on Sheet 1. In case of breakage or slack of the cable, the spring H acts, forcing down the lever P, raising the forward end of the lever O, and with it the rod N, which raises the inner end of the lever J, throwing down the cross-head J', and releasing the arm or lever K; and in case of too great speed the governor acts and forces down the inner end of the lever P by the pin $p$, raising the forward end of the lever O, and with it the rod N, which also raises the outer end of the lever J, throwing down the cross-head J', and releasing the arms or levers K.

As shown, double sets of eccentrics are provided, with actuating devices therewith; but it is evident that one set could be used, working in connection with sliding guides or brake-shoes on the opposite side of the guide-rail, and that, instead of using two shafts L, a single shaft with eccentrics could be used with beneficial and good results, and instead of mounting these shafts on the sides of the bars C they could be mounted in bearings secured to the under side of such bar C, and projecting out in a proper manner. The springs $i$ alone could be used for throwing the arms or levers K down; or weights only could be used, or both weights and springs, if so desired.

The arrangement shown on Sheet 2 of the clamping-cams below the cage or platform could be operated, where a single cable is used instead of a double, by extending the rods or pin F up through the upper cross-bar, C, and connecting them to the lifting-pin F of Sheet 1 by means of a suitable cross head or plate extending from rod to rod.

By using two levers, I J, as shown and described, it will be seen that but very little movement of either lever is required to operate the clamping-eccentrics, as the arms or levers K, which hold the eccentrics out of contact, are held just sufficiently by the cross-head J' to prevent them from becoming displaced in the ordinary working of the elevator, and consequently a very slight movement of the levers I J, or either of them, will throw the cross-head out of engagement with the arms or levers, allowing them to fall and throw the eccentrics into engagement, the result being a very quick and positive stoppage of the cage or platform.

What I claim as new, and desire to secure by Letters Patent, is—

1. In a safety attachment for elevators, a lifting or controlling lever pivotally supported, and having at one end a cross-head, in combination with a secondary lever adapted to come in contact with the lifting-lever, and means for operating either lever, substantially as described.

2. The combination of the lifting or controlling lever pivotally supported, and provided at one end with a cross-head, with a secondary lever engaging the cross-head of the lifting-lever, and means for operating either lever, and one or more eccentrics adapted to come in contact with a rail or bar operated from the cross-head of the lifting or controlling lever, substantially as specified.

3. The combination of a lifting or controlling lever pivotally supported, and provided at one end with a cross-head, with one or more eccentrics adapted to operate on a rail or bar, one or more rock-shafts connected with the eccentrics, and connecting devices between the rock-shaft and the cross-head on the lifting or controlling lever, a secondary lever engaging with the cross-head, and means for operating either lever, substantially as described.

4. The combination of the lifting or controlling lever pivotally supported, and provided at one end with a cross-head, one or more eccentrics adapted to operate on a rail or bar, one or more rock-shafts connected with the eccentrics, and arms or levers attached to the rock-shaft, and connected with the cross-head on the lifting or controlling lever, with a secondary lever engaging with the cross-head, and means for operating either lever, substantially as specified.

PETER J. SINGER.

Witnesses:
O. W. BOND,
ALBERT H. ADAMS.